United States Patent [19]
Ohlsson

[11] Patent Number: 5,642,606
[45] Date of Patent: Jul. 1, 1997

[54] SEALING APPARATUS FOR PACKAGING CONTAINERS

[75] Inventor: Per Ohlsson, Tokyo, Japan

[73] Assignee: Tetra Laval Holdings & Finance S.A., Switzerland

[21] Appl. No.: 553,671

[22] PCT Filed: Jul. 15, 1994

[86] PCT No.: PCT/JP94/01161

§ 371 Date: Dec. 11, 1995

§ 102(e) Date: Dec. 11, 1995

[87] PCT Pub. No.: WO95/02537

PCT Pub. Date: Jan. 26, 1995

[30] Foreign Application Priority Data

Jul. 15, 1993 [JP] Japan .................. 5-175073

[51] Int. Cl.$^6$ .................................................. B65B 43/26
[52] U.S. Cl. ..................... 53/565; 53/DIG. 2; 156/580.2
[58] Field of Search ........................... 156/73.1, 580.2, 156/581; 53/565, DIG. 2, 376.4, 373.6; 493/121, 141, 184, 394

[56] References Cited

U.S. PATENT DOCUMENTS

| | | | |
|---|---|---|---|
| 3,468,731 | 9/1969 | Obeda | 53/DIG. 2 |
| 4,159,220 | 6/1979 | Bosche et al. | |
| 4,241,560 | 12/1980 | Deimel et al. | 53/DIG. 2 |
| 4,251,303 | 2/1981 | Deimel et al. | 53/DIG. 2 |
| 4,403,465 | 9/1983 | Bachner | 53/DIG. 2 |
| 4,534,818 | 8/1985 | Kreager et al. | 156/581 |
| 4,581,873 | 4/1986 | Knuppertz et al. | 156/580.2 |

FOREIGN PATENT DOCUMENTS

| | | |
|---|---|---|
| 52-101194 | 8/1977 | Japan . |
| 52-146387 | 12/1977 | Japan . |
| 55-64006 | 5/1980 | Japan . |

*Primary Examiner*—James F. Coan
*Assistant Examiner*—Gene L. Kim
*Attorney, Agent, or Firm*—Lorusso & Loud

[57] ABSTRACT

A sealing apparatus for packaging containers includes an anvil (23) for supporting a sealing fin portion (21), a horn (35) composed of a columnar portion and a converging portion (35b), and means for pressing said sealing fin portion (21) against the anvil (23) through the tip of the horn (35) and for transmitting ultrasonic vibration to the sealing fin portion (21). Ultrasonic vibration is transmitted to the packaging material through the horn (35) so that each pair of opposing sealant layers is fused and sealed. In addition, means for absorbing ultrasonic vibration is disposed between the tip of the horn (35) and an edge portion (25) of the sealing fin portion (21) so that ultrasonic vibration is absorbed. When the ultrasonic vibration is transmitted to the sealing fin portion (21), the sealing fin portion (21) is excited to transmit the vibration toward the edge portion (25). However, since the ultrasonic vibration is absorbed by the means for absorbing ultrasonic vibration, the ultrasonic vibration is not transmitted to the edge portion (25). Accordingly, it is possible to prevent the generation of dust from an end surface of the paper substrate which is exposed at the edge portion (25) of the sealing fin portion (21).

6 Claims, 6 Drawing Sheets

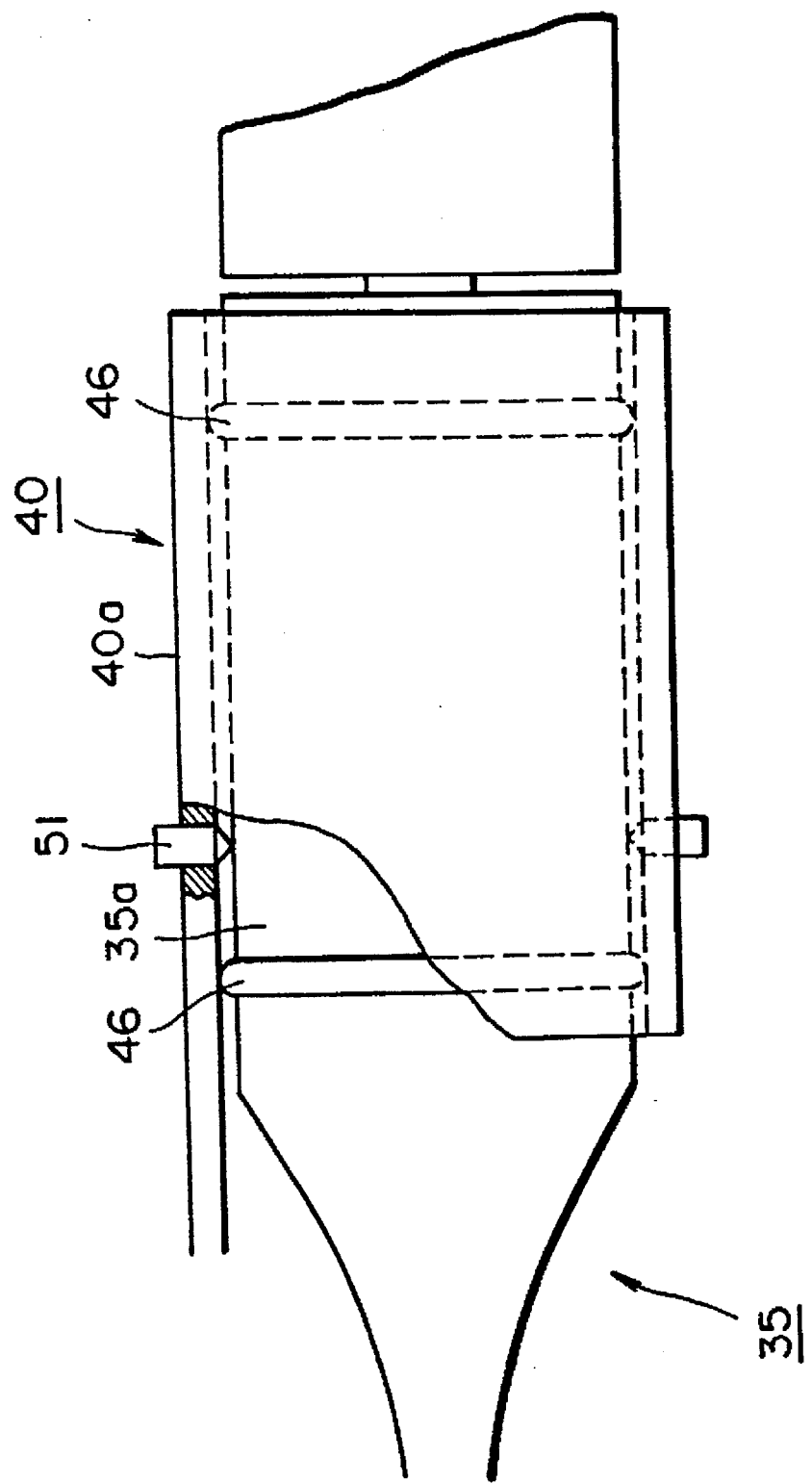

SEALING APPARATUS FOR PACKAGING CONTAINERS

TECHNICAL FIELD

The present invention relates to a sealing apparatus for packaging containers.

BACKGROUND ART

Conventionally, various types of packaging containers having different shapes have been used for liquid foods such as soft drinks and milk. One such packaging container is a gable-top type packaging container which has a roof-shaped top. When the gable-top type packaging container is used, a carton blank is first formed into a square tubular carton by a filling machine, and a spout is then attached to the carton. The bottom end of the carton is then sealed by mandrels to make a bottom. A liquid food is then placed in the carton having a bottom through the top opening thereof.

After the liquid food has been placed in the carton, the top portion of the carton is folded along predetermined pleat lines, and is then sealed.

FIG. 1 is a side view of a square tubular carton which is used for forming a gable-top type packaging container, FIG. 2 is a side view of a packaging container, and FIG. 3 is a perspective view of a packaging container.

In these drawings, numeral 11 denotes a square tubular carton made of a packaging material, and numeral 12 denotes a spout attached to a predetermined position of the carton 11.

A plurality of pleat lines a through f are formed on the square tubular carton 11. The carton is folded along the pleat lines a through f to form a triangular panel 15, folding panels 16, inner sealing fins 17, outer sealing fins 18, and slanting roof panels 19. After the carton is folded along the pleat lines a through f, each pair of sealant layers of the inner sealing fins 17 facing each other is fused while each pair of sealant layers of the outer sealing fins 18 facing each other is also fused, thereby forming a packaging container 13.

An object of the present invention is to solve the above-mentioned problems in the conventional sealing apparatus for packaging containers and to provide an improved sealing apparatus for packaging containers which does not produce dust from an end surface of a paper substrate, which dust would otherwise fly around.

DISCLOSURE OF THE INVENTION

To achieve the above object, a sealing apparatus for packaging containers according to the present invention can be applied to production of a gable-top type packaging container in which a square tubular carton is folded along pleat lines, and each pair of sealant layers of a sealing fin portion facing each other is fused for sealing, whereby the gable-top type packaging container is formed.

The sealing apparatus according to the present invention includes an anvil for supporting a sealing fin portion, a horn composed of a columnar portion and a converging portion, and means for pressing the sealing fin portion against the anvil through the tip of the horn and for transmitting ultrasonic vibration to the sealing fin portion. The horn transmits the ultrasonic vibration to the packaging material, thereby fusing each pair of sealant layers of the sealing fin portion to effect sealing.

In addition, there is provided ultrasonic vibration absorbing means between the tip of the horn and the edge portion of the sealing fin portion for absorbing ultrasonic vibration.

When ultrasonic vibration is transmitted to the sealing fin portion, the sealing fin portion 21 is excited to transmit the vibration toward the edge portion. However, since the vibration is absorbed by the ultrasonic vibration absorbing means, the vibration does not reach the edge portion. Accordingly, it is possible to prevent the generation of dust from an end surface of the paper substrate which is exposed to the outside at the edge portion of the sealing fin portion.

In another sealing apparatus for packaging containers according to the present invention, the ultrasonic vibration absorbing means is a projection which is formed on the anvil for holding a packaging material in cooperation with the tip of the horn. In this case, since ultrasonic vibration is absorbed by the anvil through the projection, the ultrasonic vibration is not transmitted to the edge portion of the sealing fin portion.

In still another sealing apparatus for packaging containers according to the present invention, the ultrasonic vibration absorbing means is an outside pusher which is disposed along the tip portion of the horn and which is pressed against the sealing fin portion.

In this case, since ultrasonic vibration is absorbed by the outside pusher, the ultrasonic vibration is not transmitted to the edge portion of the sealing fin portion.

In yet another sealing apparatus for packaging containers according to the present invention, the aforementioned outside pusher has a tubular portion surrounding the horn, and a support member which inwardly extends from the tubular portion for supporting the horn. The tip of the support member contacts a portion corresponding to a node of the standing wave of ultrasonic vibration transmitted to the horn.

Accordingly, the ultrasonic vibration transmitted to the horn is prevented from being transmitted to the outside pusher via the support member.

BRIEF DESCRIPTION OF DRAWINGS

FIG. 8 is a schematic view of a main portion of a sealing apparatus for packaging containers according to a third embodiment of the present invention.

BEST MODE FOR CARRYING OUT THE INVENTION

The embodiments of the present invention will now be described in detail with reference to the drawings.

Figure 5:
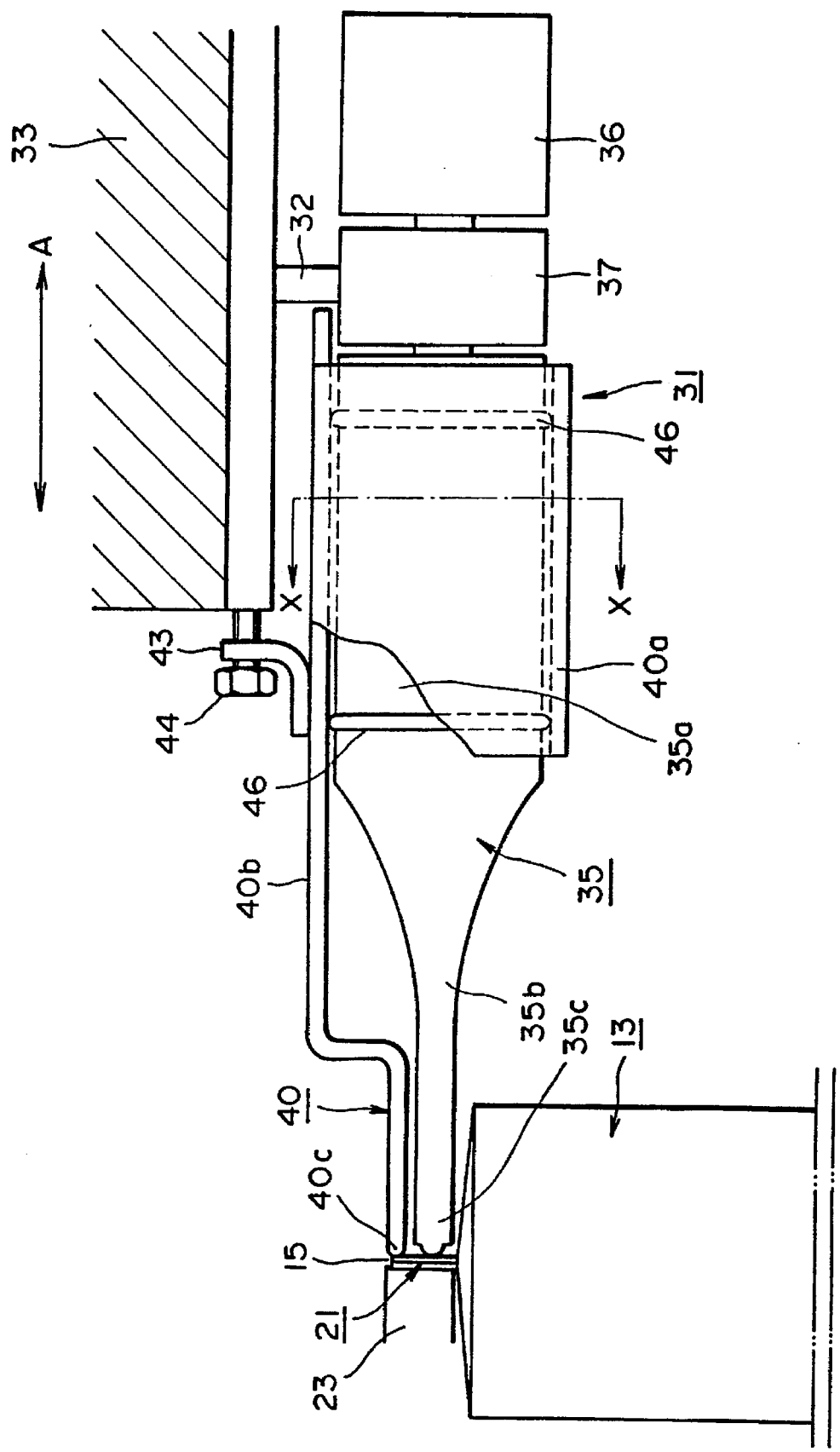
FIG. 5 is a schematic view of a sealing apparatus for packaging containers according to a first embodiment of the present invention.
Figure 6:
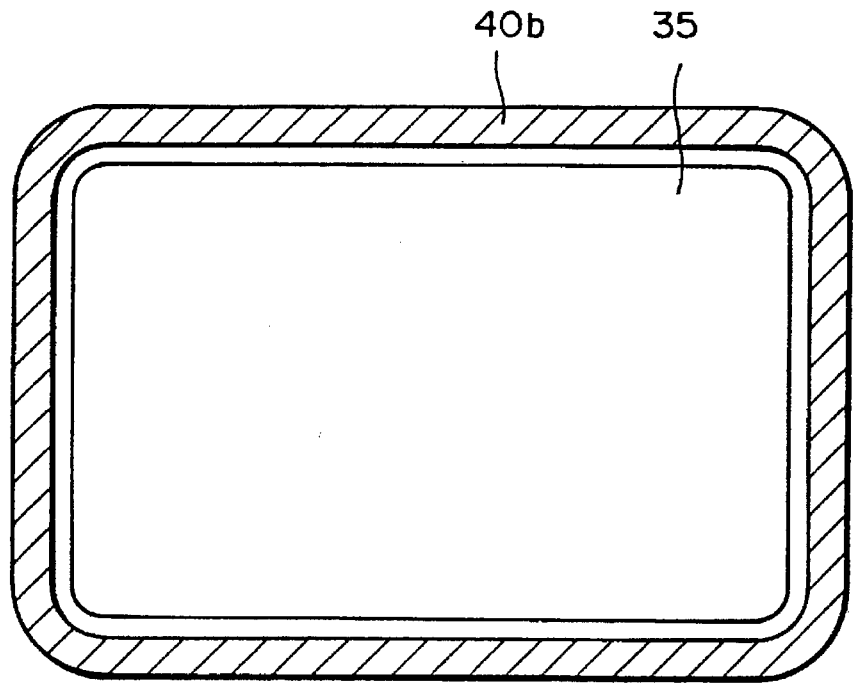
FIG. 6 is a sectional view taken along line X—X in FIG. 5.

FIG. 5 is a schematic view of a sealing apparatus for packaging containers according to a first embodiment of the present invention, and FIG. 6 is a sectional view taken along line X—X in FIG. 5.

Figure 1:
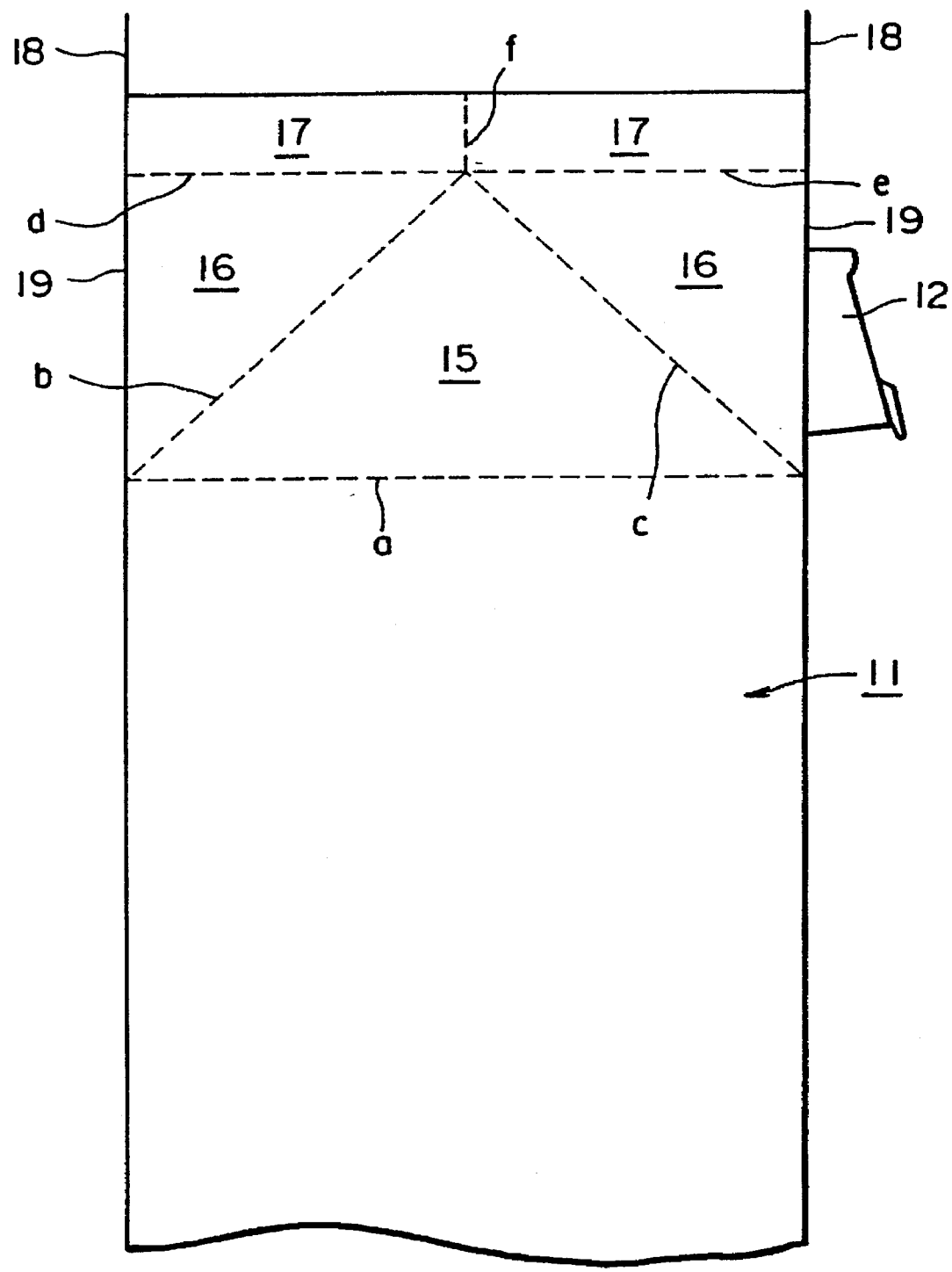
FIG. 1 is a side view of a square tubular carton which is used for forming a gable-top type packaging container.
Figure 2:
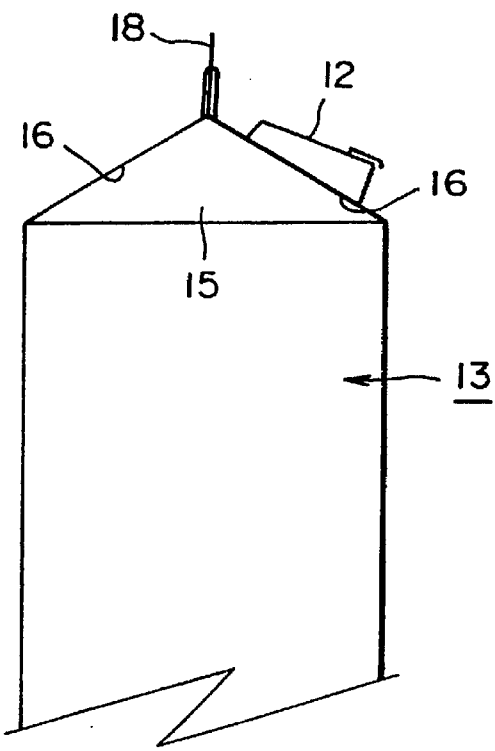
FIG. 2 is a side view of a packaging container.
Figure 3:
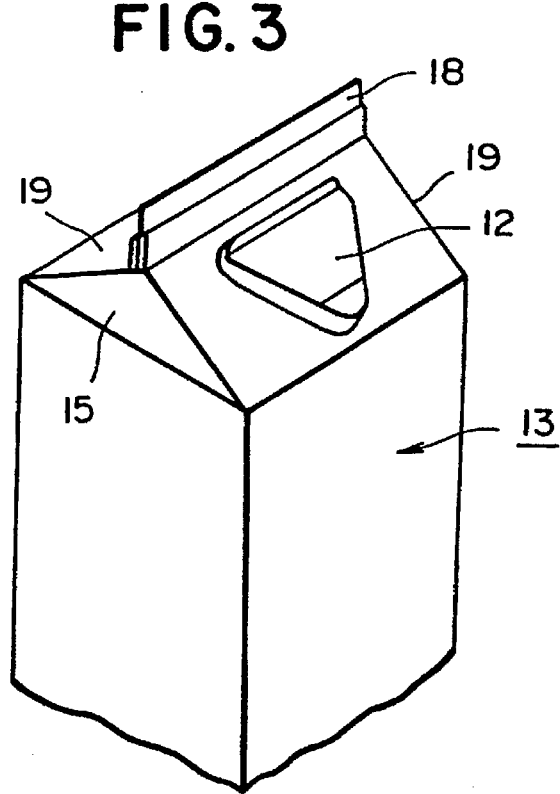
FIG. 3 is a perspective view of a packaging container.
Figure 4:
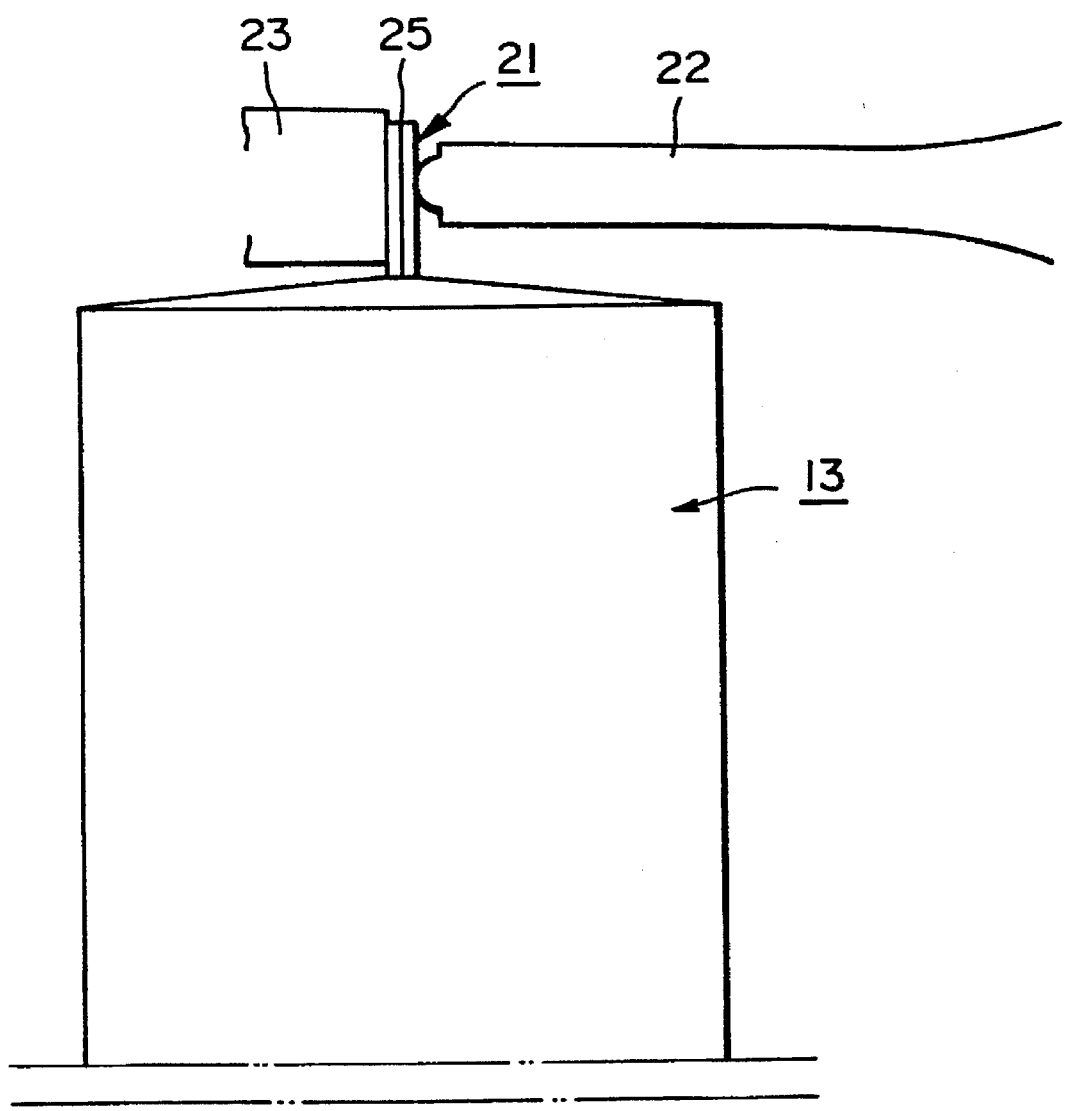
FIG. 4 is a diagram showing a sealing operation for packaging containers in which ultrasonic waves are utilized.

In the drawings, numeral 13 denotes a packaging container made of a packaging material and numeral 21 denotes a sealing fin portion composed of inner sealing fins 17 (see FIG. 1) and outer sealing fins 18. The packaging material includes a paper substrate and a polyethylene layer functioning as a sealant layer is formed on both of the surfaces of the paper substrate, one of which will become an inside surface of a packaging container (hereinafter referred to as "container inner surface") and the other of which will become an outside surface of the packaging container (hereinafter referred to as "container outer surface").

Numeral 31 denotes a sealer which is supported by a sealing apparatus body 33 through a bracket 32. The sealing apparatus body 33 is connected to an unillustrated air cylinder or the like so as to be advanced and retracted along a direction indicated by an arrow A by the air cylinder or the like.

The ultrasonic sealer 31 is composed of a horn 35, a converter 36 and a booster 37. Ultrasonic generated by the converter 36 is amplified by the booster 37, and the energy of the amplified ultrasonic waves is converged to the tip 35c. The horn 35 is composed of a rear square columnar portion 35a and a front converging portion 35b. The converging portion 35b is gradually flattened as approaching the tip 35c, and the tip 35c extends in a horizontal direction (in a direction perpendicular to the drawing) along the outer sealing fins 18.

In addition, an anvil 23 is disposed in front of the horn 35. When the horn 35 is advanced to its advanced position, the sealing fin portion 21 is pressed by the horn 35 toward the anvil 23 so that ultrasonic vibration is transmitted to the sealing fin portion 21. As a result, each pair of opposing sealant layers is fused and joined.

Further, in order to prevent the edge portion 25 of the sealing fin portion 21 from vibrating which may occur due to ultrasonic vibration transmitted to the sealing fin portion 21, an outside pusher 40 functioning as an ultrasonic vibration absorbing means is disposed along the horn 35. The outside pusher 40 is composed of a square tubular portion 30a and a flat portion 40b disposed along the converging portion 35b, and the tip 40c of the outside pusher 40 contacts the sealing fine portion 21 at a position between the tip 35c of the horn 35 and the edge portion 25 of the sealing fin portion 21, and extends in a horizontal direction (in a direction perpendicular to the drawing) along the tip 35c.

The tip 40c of the outside pusher 40 presses the sealing fin portion 21 against the anvil 23 in cooperation with the tip 35c of the horn 35.

When the ultrasonic sealer 31 is operated and ultrasonic vibration is then transmitted to the sealing fin portion 21, the sealing fin portion 21 is excited to transmit the vibration toward the edge portion 25. However, since the sealing fin portion 21 is pressed against the anvil 23 by the outside pusher 40, the vibration is absorbed by the outside pusher 40 so that the vibration does not reach the edge portion 25.

In the above-mentioned manner, the edge portion 25 is prevented from vibrating. Accordingly, it is possible to prevent the generation of dust from an end surface of the paper substrate which is exposed to the outside at the edge portion 25 of the sealing fin portion 21.

The position of the tip 40c of the outside pusher 40 can be adjusted with respect to the position of the tip 35c of the horn 35. For this adjustment, a projection member 43 is fixed to the outside pusher 40, and an adjusting bolt 44 which is in screw engagement with the projection member 43 contacts the front end of the sealing apparatus body 33.

Further, a pair of elastic rings 46 are interposed between the square columnar portion 35a and the square tubular portion 40a, so that ultrasonic vibration in the horn 35 is prevented from being transmitted to the outside pusher 40.

Next, a second embodiment of the present invention will be described.

Figure 7:
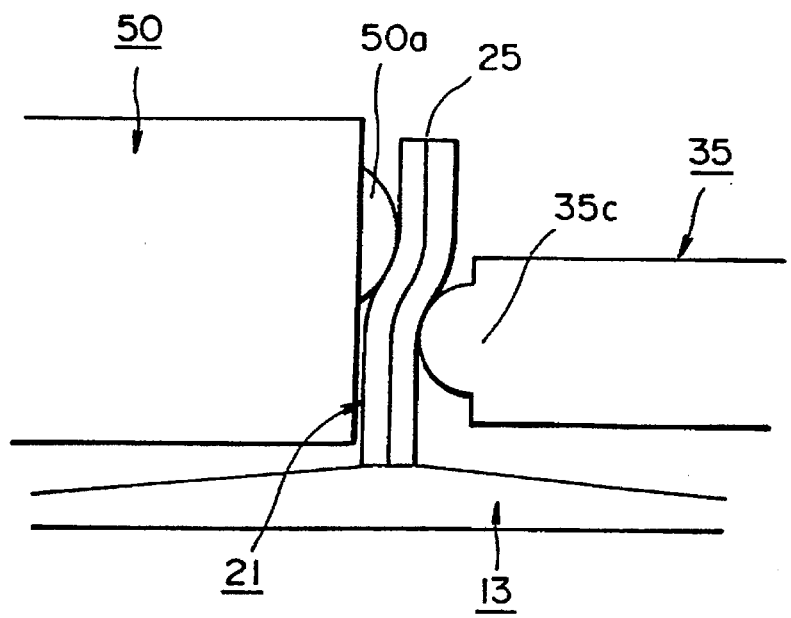
FIG. 7 is a schematic view of a main portion of a sealing apparatus for packaging containers according to a second embodiment of the present invention.

FIG. 7 is a schematic view of a main portion of a sealing apparatus for packaging containers according to the second embodiment of the present invention.

In FIG. 7, numeral 13 denotes a packaging container, numeral 21 denotes a sealing fin portion, numeral 35 denotes a horn, and numeral 50 denotes an anvil disposed in front of the horn 35. When the horn 35 is advanced to its advanced position, the sealing fin portion 21 is pressed by the horn 35 toward the anvil 50 so that ultrasonic vibration is transmitted to the sealing fin portion 21. As a result, each pair of opposing sealant layers is fused and joined.

Further, in order to prevent the edge portion 25 of the sealing fin portion 21 from vibrating which may occur due to ultrasonic vibration transmitted to the sealing fin portion 21, an elongated projection 50a functioning as an ultrasonic vibration absorbing means is formed on a surface of the anvil 50 facing to the horn 35. The projection 50a extends in a horizontal direction (in a direction perpendicular to the drawing) at a position between the tip 35c of the horn 35 and the edge portion 25. Accordingly, the sealing fin portion 21 is held between the projection 50a and the tip 35c, when the sealing fin portion 21 is pressed against the anvil 50 by the horn 35 located in its advanced position.

When the ultrasonic sealer 31 (see FIG. 5) is operated and ultrasonic vibration is transmitted to the sealing fin portion 21, the sealing fin portion 21 is excited to transmit the vibration toward the edge portion 25. However, since the sealing fin portion 21 is held between the projection 50a and the tip 35c, the ultrasonic vibration is absorbed by the anvil 50 through the projection 50a so that the vibration does not reach the edge portion 25.

In the above-mentioned manner, the edge portion 25 is prevented from vibrating. Accordingly, it is possible to prevent the generation of dust from an end surface of the paper substrate which is exposed to the outside at the edge portion 25 of the sealing fin portion 21.

Next, a third embodiment of the present invention will be described.

FIG. 8 is a schematic view of a main portion of a sealing apparatus for packaging containers according to the third embodiment of the present invention.

In FIG. 8, numeral 35 denotes a horn, and numeral 40 denotes an outside pusher disposed along the horn 35, acting as an ultrasonic vibration absorbing means. The outside pusher 40 has a square tubular portion 40a surrounding the square columnar portion 35a of the horn 35. In addition, a pair of elastic rings 46 are interposed between the square columnar portion 35a and the square tubular portion 40a, so that ultrasonic vibration in the horn 35 is prevented from being transmitted to the outside pusher 40.

Further, a support member 51 is fixed to the square tubular portion 40a and inwardly extends so that the tip of the support member 51 contacts the square columnar portion 35a. The position at which the tip of the support member 51 contacts the square columnar portion 35a is selected to correspond to a node of the standing wave of ultrasonic vibration transmitted to the horn 35. Since the outside pusher 40 supports the horn 35 through the support member 51, the bracket 32 shown in FIG. 5 can be eliminated.

The present invention is not limited to the above-mentioned embodiments. Numerous modifications and variations of the present invention are possible in light of the spirit of the present invention, and they are not excluded from the scope of the present invention.

INDUSTRIAL APPLICABILITY

The sealing apparatus for packaging containers according to the present invention can be applied to a device for manufacturing a gable-top type packaging container.

I claim:

1. A sealing apparatus for sealing packaging containers by fusing a pair of facing sealant layers of a sealing fin portion to form a gable-top for each packaging container terminating at a free end of the sealing fin portion, said sealing apparatus comprising:

(a) an anvil for supporting said sealing fin portion,
   (b) an ultrasonic horn, composed of a columnar portion, a converging portion and a tip portion,
   (c) pressing means for pressing said sealing fin portion between said anvil and said tip portion of said horn,
   (d) ultrasonic means for generating ultrasonic vibration and for transmitting the ultrasonic vibration to said sealing fin portion through said horn, and
   (e) ultrasonic vibration absorbing means for pressing against the sealing fin portion at a position on the sealing fin portion intermediate the tip portion of said horn and the free end of said sealing fin portion and for preventing the free end portion from vibrating by absorbing ultrasonic vibration.

2. A sealing apparatus for packaging containers according to claim 1, in which said ultrasonic vibration absorbing means is a projection which is formed on said anvil for holding the packaging material in cooperation with the tip of said horn.

3. A sealing apparatus for packaging containers according to claim 1, wherein said ultrasonic vibration absorbing means is an outside pusher which is disposed parallel to said tip portion of said horn and which is pressed against said sealing fin portion.

4. A sealing apparatus for packaging containers according to claim 3, in which said outside pusher comprises a tubular portion surrounding said horn and a support member which inwardly extends from said tubular portion for supporting the horn, and the tip of said support member contacts said horn at a position corresponding to a node of standing wave of ultrasonic vibration transmitted to said horn.

5. A sealing apparatus for packaging containers according to claim 3, wherein said outside pusher is located vertically above said ultrasonic horn.

6. A sealing apparatus for packaging containers according to claim 3, in which said outside pusher comprises a tubular portion surrounding said horn.

* * * * *